United States Patent Office 2,928,877
Patented Mar. 15, 1960

2,928,877
PROCESS FOR PREPARING OXYALKYLENE-AMINES

Ernest Jaul, Marion, Ind., and William K. Langdon, Grosse Ile, and William W. Levis, Wyandotte, Mich., assignors to Wyandotte Chemicals Corporation, Wyandotte, Mich., a corporation of Michigan No Drawing. Application May 10, 1957
Serial No. 658,218

10 Claims. (Cl. 260—584)

This invention relates to a process for preparing oxyalkyleneamines. In particular, this invention provides a process for aminating a glycol ether in the vapor phase in the presence of hydrogen and an amination catalyst.

Amines which can be manufactured by this process are useful as pharmaceutical intermediates, corrosion inhibitors, intermediates for agricultural chemicals and in emulsifiers.

Various methods have been suggested for the manufacture of oxyalkyleneamines. U.S. 2,285,419, J. B. Dickey and A. R. Gray, patentees, discloses a method for producing oxyalkyleneamines by reacting certain glycol ethers with ammonia in the liquid phase and in the presence of an amination catalyst. Dickey et al. disclose in Example III that the monomethyl ether of ethylene glycol and ammonia were reacted in the presence of a nickel catalyst to give 32% β-methoxyethylamine, 11% di-β-methoxyethylamine and 7% tri-β-methoxyethylamine. The reaction was carried out by heating the reactants and catalyst in a shaking autoclave at 240° C. for 72 hours. This liquid phase process for aminating a glycol ether is not satisfactory for commercial application. The disadvantageous aspects of such a liquid phase amination process are the long reaction times and low conversions. The most significant undesirable feature of such a process is, of course, the low conversions that are obtained.

Alkoxyalkylamines which possess active pharmacological properties and which are especially useful as vasoconstrictors have been prepared by a rather elaborate synthesis. U.S. 2,764,615, J. B. Data and B. M. Sutton, patentees, discloses a method for preparing these amines which is illustrated by the following reaction:

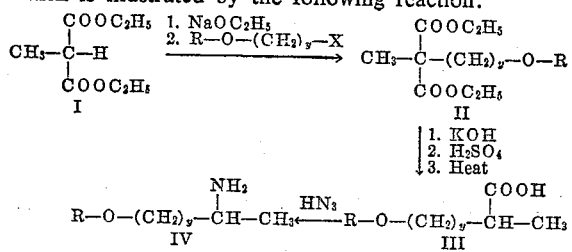

In the above method, R is an alkyl group having from 1 to 5 carbon atoms and y represents a number from 1 to 3, inclusive, X is chlorine or bromine. The diethyl substituted malonates (II) were prepared from diethyl methyl malonate (I) and an alkoxyalkyl bromide or chloride. The disubstituted esters were hydrolyzed and subsequently decarboxylated to give the alkoxyalkanoic acids, (III). The monocarboxylic acids were allowed to react with hydrazoic acid to yield the desired amines.

In contrast to the elaborate synthesis disclosed by Data et al. and in contrast to the low yields obtained by Dickey et al. in the liquid phase amination process, we have discovered that under certain controlled reaction conditions oxyalkyleneamines having one or more ether linkages can be prepared in higher conversions and yields by a simplified and economical process. Under the conditions of our process we have found that we can obtain conversions to oxyalkyleneamines ranging up to 80%.

An object of this invention is, therefore, to provide a new and improved method for preparing oxyalkyleneamines.

Another object of this invention is to provide a catalytic method for the manufacture of oxyalkyleneamines.

Another object of this invention is to provide a vapor phase catalytic method for the manufacture of oxyalkyleneamines.

A further object of this invention is to provide a vapor phase catalytic method for the manufacture of oxyalkyleneamines wherein catalyst inactivation is minimized.

A still further object of this invention is to provide a process for preparing oxyalkyleneamines wherein high conversions and yields are obtained.

We have found that oxyalkyleneamines can be produced with an unexpected and most important increase in conversion and yield when a mixture of glycol ether, ammonia and hydrogen is heated and passed in the vapor phase over a nickel or cobalt hydrogenation/dehydrogenation catalyst. The reaction is carried out at elevated temperatures in vapor phase and usually at about atmospheric pressure. Most significantly, we have found that the method does not give the high conversions and yields which are desired when the reaction is carried out under liquid phase conditions or when the feed mixture does not include hydrogen.

The glycol ethers employed in the method of the invention have boiling points which do not exceed 200° C. at 20 millimeters of mercury pressure and correspond to the general formula shown below:

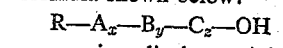

wherein R is an organic radical containing not more than 8 carbon atoms selected from the group consisting of alkyl, alkenyl, cycloalkyl, arylalkyl, alkoxyalkyl, furfuryl and tetrahydrofurfuryl radicals, A, B, C are oxyalkylene radicals having not more than 8 carbon atoms corresponding to the following formulae:

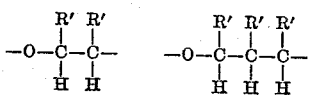

and

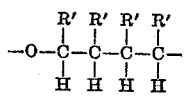

in which R' can be hydrogen or any of the radicals set forth for R above, and wherein x, y, z are 0 or 1 and collectively are at least one.

Specific examples of glycol ethers which can be used in the process of our invention are set forth as follows: 2-methoxy-1-ethanol, 2-ethoxy-1-ethanol, 2-octoxy-1-ethanol, 3-methoxy-2-butanol, 3-octoxy-2-butanol, 3-methoxy-2-octanol, 1-allyloxy-2-octanol, 1-allyloxy-3-butene-2-ol, 2-cyclohexoxy-1-ethanol, 3-ethylcyclohexoxy-2-butanol, methoxyethoxyethanol, 3,7-dioxa-1-octanol, 3,8-dioxa-1-nonanol, 2-tetrahydrofurfuroxy-1-ethanol, 3,6-dioxa-4-methyl-1-heptanol, 3,6-dioxa-4-hexyl-1-heptanol, 3,-6-dioxa-4-cyclohexyl-1-heptanol, methyl ether of tripropylene glycol, 3,8-dioxa-5-methoxy-1-nonanol, 3,6,9-trioxa-1-decanol, 3,6,9-trioxa-4,7-dimethyl-1-decanol, 3,6,9-trioxa-4-vinyl-1-decanol, 3-methoxy-1-propanol, 3-methoxy-1-butanol, 4,8-dioxa-1-nonanol, 4-methoxy-1-butanol, monomethyl ether of dibutylene glycol, 4-tetrahydrofurfuroxy-1-butanol, 3,6-dioxa-4-methoxymethyl-1-heptanol, 4,7-dioxa-5-methoxymethyl-2-decanol and the like.

A glycol ether, having the essential features as set forth hereinabove, is reacted with an aminating agent also having a boiling point which does not exceed 200° C. at 20 millimeters of mercury pressure and which can be ammonia or a primary or secondary amine in accordance with the invention. Ammonia is highly preferred as the aminating agent because we have found that unusually good yields and conversions are obtainable therewith. However, primary and secondary amines are generally applicable in the process of the invention, also, and representatives of such amines which can be used are methylamine, octylamine, methoxyisopropylamine, methoxyisopropoxyisopropylamine, dimethylamine, dibutylamine, di-(methoxyisopropyl)-amine and the like.

The catalyst used in accordance with this invention can be either a nickel or cobalt hydrogenation/dehydrogenation catalyst. The preferred catalyst is a nickel or cobalt hydrogenation/dehydrogenation catalyst deposited on a siliceous support, and a specific nickel catalyst which has been found to give excellent results is a catalyst which is sold under the code name, "Ni 0104," by Harshaw Chemical Company, Cleveland, Ohio. Harshaw catalyst Ni 0104 is supported nickel catalyst containing about 60% of nickel. The nickel is reduced in the preparation of the catalyst and thereafter it is partially re-oxidized to stabilize the catalyst and reduce its pyrophoric characteristics.

Cobalt hydrogenation/dehydrogenation catalysts also provide high conversions and yields in the process of our invention. Supported cobalt and supported nickel catalysts are commonly prepared by suspending a finely divided inert catalyst support in an aqueous solution of a salt of the nickel or cobalt. Sodium carbonate is then added to produce an insoluble nickel or cobalt carbonate. The resulting slurry is then filtered, washed with water and dried. The powdered mixture of carbonate and catalyst support is dried, mixed with a lubricant and binder, and pressed into pellets or other desired physical form. For an excellent review of the preparation of nickel or cobalt catalysts that can be used in the method of the invention, see "Catalysis" by Berkman et al., pp. 253–265, Reinhold Publishing Company, 330 W. 42nd Street, New York, New York (1940 Edition).

The process of our invention is employed in a continuous system and is carried out in the vapor phase.

We have found that the presence of hydrogen is essential for obtaining the high conversions and yields of oxyalkyleneamines produced by the process of this invention.

The relative amounts of reactants employed in our procses can be varied over a wide range. The amount of the aminating agent, ammonia or primary or secondary amine, or mixtures thereof, has no upper limit except that which is dictated by economic considerations. Thus, a large excess of the aminating agent can be used which can be separated from the reaction product and recycled to the reaction zone. In general, at least 2 mols of aminating agent are used for each mol of glycol ether in the feed. The amount of hydrogen should be equal to at least about one-fifth the total amount of the gases in the feed. The upper limit for hydrogen is also dictated by economic considerations and generally does not exceed 30 or 40 mols per mol of glycol ether feed. Thus, at least 1 mol of hydrogen is present in the feed per mol of glycol ether and higher conversions and yields are obtained when at least about 2.5 to 3 mols of hydrogen per mol of glycol ether is used. The molar ratio of these reactants used in the process of our invention is, typically, about 1 mol of glycol ether to 5 mols of ammonia to 3 mols of hydrogen.

Similarly, the amount of total feed per unit time can be varied over a wide range. This is best illustrated by space velocity. Space velocity as used herein and in the claims is defined as an arbitrary function of the total feed volume per hour as gases at 0° C. through the catalyst zone. The volume is expressed in terms of milliliters. Space velocity is defined mathematically as follows:

Space velocity, hr.$^{-1}$ $$= \frac{\text{Total mols of feed/hr.} \times 22{,}400 \text{ ml./mol}}{\text{Volume of catalyst zone, ml.}}$$

We have found, as is illustrated in Table I, that there is little decrease in total conversion when the space velocity is varied from about 465 to 930. Thus, an increase in space velocity from 465 to 930 in runs 3 and 4 of Table I resulted in a decrease in total conversion from 71 to 64 weight percent. In general, as space velocities are further increased, conversions are decreased somewhat but yields remain high. The effect of increasing space velocity on total yield is strikingly illustrated by runs 3 and 4 of Table I. We have found that as the space velocity is increased from 465 to 930 in runs 3 and 4 the total yield of oxyalkyleneamines actually increased from 81 to 82 weight percent.

The process of this invention can be carried out over a wide range of temperatures. The reaction may be carried out at temperatures generally ranging between 100 to 250° C., although for improved results we have found that in many instances the temperature preferably should be maintained within 175 to 215° C. For optimum results, however, we have found that the temperature should be maintained within the range of 180 to 200° C.

The reaction of this invention is carried out in vapor phase at about atmospheric pressure although sub-atmospheric and super-atmospheric pressures can be used.

Examples of amines which are produced in accordance with this invention, employing ammonia as the aminating agent with a glycol ether such as has been described hereinabove, are: methoxypropylamine, di(methoxyproyl)-amine, methoxyethylamine, di-(methoxyethyl)-amine, tri-(methoxyethyl)-amine, methoxyisopropoxyisopropylamine, di-(methoxyisopropoxyisopropyl)-amine, methoxyethoxyethylamine, di - (methoxyethoxyethyl)-amine, butoxyisopropylamine, di-(butoxyisopropyl)-amine, 2-octoxy-1-ethylamine, 3-octoxy-2-butylamine, 1-allyloxy-2 - octylamine, 2 - cyclohexoxy-1-ethylamine, 2-tetrahydroxyfurfuroxy - 1-ethylamine, 3,6-dioxa-4-cyclohexyl-1-heptylamine, 3 - methoxy - 1-propylamine, 3-methoxy-1-butylamine, and the like.

When this reaction is carried out under the conditions set forth herein the products of the reaction are condensed, passed through a suitable still to separate the desired amine from the unreacted glycol ether and the unreacted glycol ether can be recycled to the contacting step whereby a further quantity of the desired amine is obtained as the product of the process.

The terms "yield" and "conversion" as used in this specification are defined herein as follows. Conversion is a measure of the percent of the charged glycol ether reactant that is converted to the product of interest, that is, an oxyalkyleneamine, and conversion is calculated in accordance with the equation:

$$\text{Percent conversion} = \frac{\text{Mols of amine produced}}{\text{Mols of glycol ether fed}} \times 100$$

Yield is calculated on the basis of the glycol ether reactant actually consumed in the reaction in accordance with the equation:

$$\text{Percent yield} = \frac{\text{Mols of amine produced}}{\text{Mols of glycol ether consumed}} \times 100$$

The following examples are supplied to illustrate the process of this invention and should not be employed to unduly restrict the invention in view of the disclosure of reactants, catalysts, and conditions which have been set forth herein.

EXAMPLE I

A mixture of monomethyl ether of ethylene glycol, ammonia and hydrogen was heated and continuously passed in the vapor phase over a nickel hydrogenation/dehydrogenation catalyst.

The molar proportions of the reactants used were 1 mol of the glycol ether to 2 mols of hydrogen to 3 mols of ammonia. The reactor through which the reactants passed was charged with 290 cubic centimeters (410 grams) of Harshaw nickel catalyst, Ni 0104, and the reaction was carried out at a temperature of 180–185° C.

There was obtained a total conversion and yield of 69 and 78 weight percent, respectively, to methoxyethylamines.

The reactor employed was a one-inch steel tube core surrounded by a Dowtherm jacket and heated by a Chromel ribbon heating element. The first 32-inch portion of the reactor functioned as a vaporizing and preheating section and was packed with inert material, such as ¼-inch graphite Raschid rings. This was followed by a 24-inch section of catalyst which was maintained in position in the heated zone by a second 4-inch section of inert material.

When starting up the run, a flow of hydrogen through the reactor at the desired rate was established before heat was applied to the reactor. When the desired temperature was obtained, a flow of ammonia was then introduced into the reactor and adjusted to the proper rate. Finally, the monomethyl ether of ethylene glycol was pumped into the reactor, and the reaction was carried out for 22 hours. The crude product was worked up by fractional distillation.

The distillation was carried out in a 120 x 2.8 cm. electrically heated glass column packed with ⅛-inch single-turn glass helices. First, ammonia and other low boiling materials were removed. Then benzene was added to the kettle and water was removed as the benzene-water azeotrope using a decanted at the column head. Methanol was then added to the kettle and the benzene was removed as the benzene-methanol azeotrope. After all the methanol had been removed, the fractions corresponding to the boiling points of the desired products were collected and weighed for calculation of the conversions. The identity and purity of the fractions were checked by titration to determine the neutral equivalent.

Three other runs were carried out to determine the effects of temperature, feed ratios, and space velocity on the conversion and yield. The conditions under which all of these runs were carried out and the results of these runs are set forth in Table I below.

*Table I*

| Run No | 1 | 2 | 3 | 4 |
|---|---|---|---|---|
| Mol ratio, glycol ether:ammonia: hydrogen | 1:3:2 | 1:7.2:4 | 1:3:2 | 1:3:2 |
| Temperature, °C | 180-185 | 180-185 | 190-195 | 190-195 |
| Space Velocity, Hrs.⁻¹ | 465 | 850 | 465 | 930 |
| Time on stream, Hrs | 22 | 48 | 24 | 22 |
| Conversion and Yield, weight percent To— | | | | |
| $CH_3OCH_2CH_2NH_2$: | | | | |
| Conv | 31 | 37 | 32 | 33 |
| Yield | 35 | 40 | 35 | 41 |
| $(CH_3OCH_2CH_2)_2NH$: | | | | |
| Conv | 35 | 31 | 36 | 29 |
| Yield | 40 | 34 | 42 | 38 |
| $(CH_3OCH_2CH_2)_3N$: | | | | |
| Conv | 3 | 2 | 3 | 2 |
| Yield | 3 | 2 | 4 | 3 |
| Total methoxyethylamines: | | | | |
| Conv | 69 | 70 | 71 | 64 |
| Yield | 78 | 76 | 81 | 82 |

It will be noted from the table that the conversions to the primary and secondary methoxyethylamines were in the range of 60 to 70% and that the corresponding yields were in the range of 75 to 80%. Approximately equal amounts of primary and secondary amines were formed. This is in marked contrast to the liquid phase amination reactions disclosed by Dickey et al. wherein the reaction products in Example III of their disclosure were fractionated to give 32% β-methoxyethylamine, 11% di-β-methoxyethylamine and 7% tri-β-methoxyethylamine when the reaction was carried out at 240° C. for 72 hours. It will be further noted that our high conversions and yields are obtained from a continuous vapor phase process in which the reaction time is considerably less than the liquid phase process reaction time of Dickey et al.

EXAMPLE II

A mixture of monomethyl ether of diethylene glycol, hydrogen and ammonia was heated and continuously passed in the vapor phase over a nickel hydrogenation/dehydrogenation catalyst. The catalyst employed was Harshaw nickel catalyst Ni 0104. The reactor and distillation apparatus were the same as in Example I. The reaction was carried out continuously for 116 hours. The mol ratio of glycol ether to ammonia to hydrogen was altered at various time intervals. The space velocity was also changed at various time intervals. In this continuous run hydrogen concentration was maintained at one-third of the total molar concentration. Samples of oxyalkyleneamines were collected at the time intervals, as shown in Table II below, to determine conversions and yields.

*Table II*

| Sample No | 1 | 2 | 3 | 4 | 5 |
|---|---|---|---|---|---|
| Time, hrs | 21 | 45 | 76 | 100 | 116 |
| Mol ratio, glycol ether: ammonia: hydrogen | 1:3:2 | 1:6:3.5 | 1:9:5 | 1:2:1.5 | 1:2:1.5 |
| Space velocity, hrs.⁻¹ | 465 | 465 | 465 | 345 | 695 |
| Temperature °C | 190 | 190 | 190 | 190 | 190 |
| Conversion and Yield, weight percent To— | | | | | |
| $CH_3OCH_2CH_2OCH_2CH_2NH_2$: | | | | | |
| Conv | 23 | 35 | 35 | 14 | 14 |
| Yield | 30 | 37 | 36 | 18 | 26 |
| $(CH_3OCH_2CH_2OCH_2CH_2)_2NH$: | | | | | |
| Conv | 20 | 23 | 12 | 17 | 18 |
| Yield | 26 | 25 | 13 | 23 | 33 |
| $(CH_3OCH_2CH_2OCH_2CH_2)_3N$: | | | | | |
| Conv | 5 | 2 | 1 | 8 | 5 |
| Yield | 6 | 2 | 2 | 10 | 9 |
| Total methoxyethoxyethylamines: | | | | | |
| Conv | 48 | 60 | 48 | 39 | 36 |
| Yield | 62 | 64 | 50 | 51 | 67 |

It will be noted from the table that by increasing the ratio of ammonia to glycol ether in Samples 1, 2, and 3, the proportion of primary amine was increased and the proportion of secondary and tertiary amine was decreased in the product. The highest total conversion of these amines was obtained at 6:1 mol ratio of ammonia to glycol ether in Sample No. 2.

EXAMPLE III

A series of runs was carried out wherein a mixture of methyl ether of propylene glycol (methoxyisopropanol), hydrogen and ammonia was heated and continuously passed in the vapor phase over a nickel hydrogenation/dehydrogenation catalyst. The catalyst employed, as will be noted in Table III, was either Harshaw nickel catalyst Ni 0104 or Ni 0107. The equipment and procedure were the same as in Example I except that in several of the runs an electrically heated iron core-furnace was used in place of the Dowtherm jacketed reactor.

Several runs were made to determine the effect of the major variable in this process. These variables include temperature, feed ratios and feed rates. The results of these runs are set forth in Table III below.

Table III

| Run No | 1 | 2 | 3 | 4 |
|---|---|---|---|---|
| Temperature, °C | 180-185 | 180-185 | 195-200 | 210-215 |
| Space Velocity, hrs.⁻¹ | 455 | 410 | 455 | 420 |
| Methoxyisopropanol feed, mols/hr | 1.0 | 1.0 | 1.0 | 1.0 |
| NH₃, mols/hr | 2.5 | 5.0 | 2.5 | 2.5 |
| H₂, mols/hr | 2.5 | 3.0 | 2.5 | 2.5 |
| Total Liquid Feed, g | 989 | 732 | 1,104 | 1,120 |
| Time on Stream, hrs | 12 | 13.5 | 13.5 | 12.0 |
| Nickel Catalyst Type | 0107 | 0107 | 0107 | 0104 |
| Catalyst g | 422 | 422 | 422 | 432 |
| Conversion, weight percent To: | | | | |
| Methoxyisopropylamine | 46 | 50 | 40 | 33 |
| Di-(methoxyisopropyl)-amine | 8 | 5 | 7 | 8 |
| Total Methoxyisopropylamines | 54 | 55 | 47 | 41 |

It will be noted from the table that by increasing the ratio of ammonia to glycol ether in Runs 1 and 2 the proportion of primary amine was increased and the proportion of secondary amine was decreased in the product. Although the process of this invention is operable over a wide temperature range, it has been found, as will be noted from the table, that optimum conversions were obtained when the temperature was in the range of 180° to 200° C.

EXAMPLE IV

A mixture of methyl ether of propylene glycol, hydrogen and ammonia was heated and continuously passed in the vapor phase over a nickel hydrogenation/dehydrogenation catalyst. The reactor, catalyst and procedure were the same as in Example I. The run was carried out continuously over Harshaw nickel catalyst Ni 0104 for approximately 68 hours under the conditions set forth in Table IV below. The initial hydrogen feed rate of 2 mols per hour was stopped after 24 hours and the run was continued in the absence of added hydrogen with the aminating agent and the glycol ether as the feed. Samples of oxyalkylene amines were collected at the time intervals indicated in Table IV below to determine conversions and yields.

Table IV

| Sample No | 1 | 2 | 3 |
|---|---|---|---|
| Time on Stream, hrs | 22.5 | 24.0 | 21.5 |
| Temperature, °C | 180-185 | 180-185 | 180-185 |
| Space Velocity, hrs.⁻¹ | 420 | 280 | 280 |
| Methoxyisopropanol feed, mols/hr | 0.8 | 0.8 | 0.8 |
| NH₃, mols/hr | 3.2 | 3.2 | 3.2 |
| H₂, mols/hr | 2.0 | 0.0 | 0.0 |
| Total Liquid Feed, g | 1,606 | 1,709 | 1,621 |
| Nickel Catalyst Type | 0104 | 0104 | 0104 |
| Catalyst g | 449 | 449 | 449 |
| Conversion, weight percent To: | | | |
| Methoxyisopropylamine | 56 | 17 | 0.5 |
| Di-(methoxyisopropyl)-amine | 2 | 0.0 | 0.0 |
| Total Methoxyisopropylamines | 58 | 17 | 0.5 |

The result of this continuous run was of great significance because it clearly demonstrated the necessity of hydrogen in carrying out this continuous vapor phase amination process. It will be noted that the initial conversion of 58 weight percent to methoxyisopropylamine fell to 17 weight percent in the first 24 hours after the hydrogen flow was turned off. After the next 22 hours the catalyst was completely inactive.

EXAMPLE V

A mixture of monomethyl ether of propylene glycol, hydrogen and ammonia was heated and continuously passed in the vapor phase over a nickel hydrogenation/dehydrogenation catalyst. The catalyst employed was Harshaw nickel catalyst Ni 0104. The reactor, distillation apparatus and procedure were the same as in Example I except that the unreacted glycol ether was recycled through the reactor. The run was carried out continuously for 340 hours at a feed ratio of 1 mol of glycol ether to 4 mols of ammonia to 2.5 mols of hydrogen and at temperatures ranging from 180° to 190° C. Samples were collected at approximately 24-hour intervals to determine conversion to the primary and secondary amines. There was obtained at the end of 30.5, 126.5 and 318.5 hours conversion of 49, 46 and 42 percent, respectively, to the methoxyisopropylamines. The unreacted glycol ether in the product was recycled through the reactor and there was obtained a total yield of approximately 70 weight percent to the methoxyisopropylamines.

EXAMPLE VI

A mixture of methyl ether of dipropylene glycol, ammonia and hydrogen was heated and continuously passed in the vapor phase over a nickel hydrogenation/dehydrogenation catalyst. The catalyst employed, as will be noted in Table V, was either Harshaw nickel catalyst Ni 0104 or Ni 0107. Employing the same apparatus and procedure as in Example III, a series of runs were carried out, the results of which are set forth in Table V below.

Table V

| Run No | 1 | 2 | 3 | 4 | 5 |
|---|---|---|---|---|---|
| Temperature, °C | 185-195 | 180-185 | 180-185 | 190-195 | 190-195 |
| Space Velocity, hrs.⁻¹ | 455 | 385 | 380 | 385 | 380 |
| Mol ratio, glycol ether: NH₃:H₂ | 1:2.5:2.5 | 1:2.5:2 | 0.6:5.3 | 1:2.5:2 | 0.6:5:3 |
| Total liquid feed, g | 1,803 | 1,010 | 1,142 | 1,925 | 1,146 |
| Time on Stream, Hrs | 13.0 | 7.5 | 13.0 | 13.0 | 12.5 |
| Catalyst type | 0107 | 0104 | 0104 | 0104 | 0104 |
| Conversion and Yield, weight percent To— | | | | | |
| Methoxyisopropoxyisopropylamine: | | | | | |
| Conv | 39 | 45 | 59 | 47 | 49 |
| Yield | 55 | 49 | 66 | 52 | 52 |
| Di(methoxyisopropoxyisopropyl)-amine: | | | | | |
| Conv | 12 | 11 | 10 | 17 | 10 |
| Yield | 17 | 12 | 12 | 19 | 11 |
| Total Methoxyisopropoxyisopropylamines: | | | | | |
| Conv | 51 | 56 | 69 | 64 | 59 |
| Yield | 72 | 61 | 78 | 71 | 63 |

There was obtained a maximum conversion and yield of 59 and 66 weight percent, respectively, to methoxyisopropxyisopropylamine when the reaction was carried out at a temperature of 180-185° C. at a molar feed ratio of .6 mol of glycol ether to 5 mols of ammonia to 3 mols of hydrogen for 13 hours.

EXAMPLE VII

A mixture of methyl ether of tripropylene glycol, ammonia and hydrogen was heated and continuously passed in the vapor phase over a nickel hydrogenation/dehydrogenation catalyst. An aqueous solution consisting of 1 mol of glycol ether and 1 mol of water was employed. The catalyst employed was Harshaw nickel catalyst Ni 0104. The reactor, distillation apparatus and procedure were the same as in Example I. There was obtained a conversion of 30% to methoxyisopropoxyisopropylamine when the reaction was carried out at a molar feed ratio of 2 mols of glycol ether to 5 mols of ammonia to 3 mols of hydrogen for 32.8 hours at a temperature of 185–190° C.

EXAMPLE VIII

A mixture of butyl ether of propylene glycol, ammonia and hydrogen was heated and continuously passed in the vapor phase over a nickel hydrogenation/dehydrogenation catalyst. The reactor, catalyst and procedure were the same as in Example I. There was obtained a conversion of 34% to the butyl ether of isopropylamine and a total conversion of 40% to butoxyisopropylamines when the reaction was carried out at a temperature of 185–190° C. for 10.5 hours at a molar feed ratio of 1 mol of glycol ether to 2.5 mols of ammonia to 2.5 mols of hydrogen.

EXAMPLE IX

The liquid phase amination of the methyl ether of propylene glycol was carried out in order to demonstrate the differences in kind between this process and our new vapor phase process. In these runs a one-gallon stainless steel autoclave was charged with 20 mols of ammonia as a 28 weight percent aqueous solution and 8.0 mols of the glycol ether. About 80 grams of Raney nickel catalyst, on a wet basis, was washed into the autoclave with the liquid feed. The conditions under which the reaction was carried out and the results are set forth in Table VI below.

Table VI

| Run No. | 1 | 2 | 3 |
|---|---|---|---|
| Pressure, p.s.i.g | 565 | 700 | 1,070 |
| Temperature, °C | 190 | 200 | 240 |
| Time, Hrs | 4 | 5 | 6 |
| Conversion and Yield, weight percent To— Methoxyisopropylamine: | | | |
| Conv | 9 | 8 | 18 |
| Yield | | 34 | 36 |

It will be noted from the table that high pressures and temperatures are required in the liquid phase batch process in order to obtain a conversion of 18% to methoxyisopropylamine whereas the vapor phase process of the invention disclosed herein employs lower temperatures and about atmospheric pressure to obtain conversions in the range of 54 to 55 weight percent as set forth in Table III.

It is apparent that the objectives of this invention have been accomplished. Broadly speaking, a new and improved method of preparing oxyalkyleneamines with high conversions and yields has been provided which comprises reacting a glycol ether with an aminating agent, as herein defined, in the vapor phase and in the presence of hydrogen and a nickel or cobalt hydrogenation/dehydrogenation catalyst.

What is claimed is:

1. A method for preparing methoxyisopropylamine which comprises, heating and vaporizing a mixture of ammonia, hydrogen and the methyl ether of propylene glycol, and passing said heated and vaporized mixture over a nickel hydrogenation/dehydrogenation catalyst at a temperature of about 175° to about 215° C. at about atmospheric pressure.

2. A method for preparing methoxyisopropoxyisopropylamine which comprises, heating and vaporizing a mixture of ammonia, hydrogen and the methyl ether of dipropylene glycol, and passing said heated and vaporized mixture over a nickel hydrogenation/dehydrogenation catalyst at a temperature of about 175° to about 215° C. at about atmospheric pressure.

3. A method for preparing butoxyisopropylamine which comprises heating and vaporizing a mixture of ammonia, hydrogen and the butyl ether of propylene glycol, and passing said heated and vaporized mixture over a nickel hydrogenation/dehydrogenation catalyst at a temperature of about 175° to 215° C. at about atmospheric pressure.

4. A method for preparing glycol ether amines, which comprises heating and vaporizing a mixture of a subsequently defined glycol ether, hydrogen and an aminating agent selected from the group consisting of (1) ammonia, (2) glycol ether amines of the formula

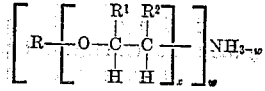

wherein R is an alkyl radical of from 1 to 8 carbon atoms, $R^1$ and $R^2$ are members selected from the group consisting of hydrogen, methyl and ethyl radicals and collectively contain up to 2 carbon atoms, $x$ has a value ranging from about 1 to 3, inclusive, and $w$ has a value ranging from 1 to 2, inclusive, (3) a mono-lower alkyl amine and (4) a di-lower alkyl amine, and passing said heated vaporized mixture over a hydrogenation/dehydrogenation catalyst selected from the group consisting of nickel and cobalt at a temperature from about 150°–250° C., said glycol ether and said aminating agents having boiling points up to about 200° C. at 20 mm. of mercury pressure, said glycol ether corresponding to the formula

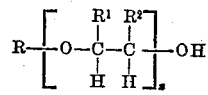

wherein R is an alkyl radical of from 1 to 8 carbon atoms, $R^1$ and $R^2$ are members selected from the group consisting of hydrogen, methyl and ethyl radicals and collectively contain up to 2 carbon atoms and $x$ has a value ranging from 1 to 3, inclusive.

5. A continuous process for preparing glycol ether amines, which comprises heating and vaporizing a feed mixture consisting essentially of glycol ether, hydrogen and an aminating agent together with a recycle stream derived as hereinafter defined, said glycol ether corresponding to the formula

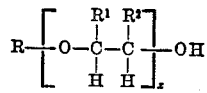

wherein R is an alkyl radical of from 1 to 8 carbon atoms, $R^1$ and $R^2$ are members selected from the group consisting of hydrogen, methyl and ethyl radicals and collectively contain up to 2 carbon atoms and $x$ has a value ranging from 1 to 3, inclusive, said aminating agent being a member selected from the group consisting of (1) ammonia, (2) glycol ether amines of the formula

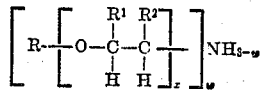

wherein R is an alkyl radical of from 1 to 8 carbon atoms, $R^1$ and $R^2$ are members selected from the group consisting of hydrogen, methyl and ethyl radicals and collectively contain up to 2 carbon atoms, $x$ has a value ranging from 1 to 3, inclusive, and $w$ has a value ranging from 1 to 2, inclusive, (3) a mono-lower alkyl amine and (4) a di-lower alkyl amine, said glycol ether and said aminating agent having boiling points up to about 200° C. at 20 mm. of mercury pressure, and passing said heated and vaporized mixture over a hydrogenation/dehydrogenation catalyst selected from the group consisting of nickel and cobalt, recovering a product from said passing step, fractionally distilling said product to produce glycol ether amine and unreacted glycol ether and returning said unreacted glycol ether to said feed mixture as said recycle stream.

6. A method in accordance with claim 5 wherein said glycol ether is the monomethyl ether of ethylene glycol, said aminating agent is ammonia and said catalyst is a nickel hydrogenation/dehydrogenation catalyst.

7. A method in accordance with claim 5 wherein said glycol ether is the monomethyl ether of diethylene glycol, said aminating agent is ammonia and said catalyst is a nickel hydrogenation/dehydrogenation catalyst.

8. A method in accordance with claim 5 wherein said glycol ether is the monomethyl ether of propylene glycol, said aminating agent is ammonia and said catalyst is a nickel hydrogenation/dehydrogenation catalyst.

9. A method in accordance with claim 5 wherein said glycol ether is the monomethyl ether of dipropylene glycol, said aminating agent is ammonia and said catalyst is a nickel hydrogenation/dehydrogenation catalyst.

10. A method in accordance with claim 5 wherein said glycol ether is the monobutyl ether of propylene glycol, said aminating agent is ammonia and said catalyst is a nickel hydrogenation/dehydrogenation catalyst.

References Cited in the file of this patent

UNITED STATES PATENTS

| | | |
|---|---|---|
| 2,285,419 | Dickey et al. | June 9, 1942 |
| 2,365,721 | Olin et al. | Dec. 26, 1944 |
| 2,412,209 | Dickey et al. | Dec. 10, 1946 |
| 2,519,560 | Fowler | Aug. 22, 1950 |
| 2,529,923 | Dickey et al. | Nov. 14, 1950 |
| 2,754,330 | Schreyer | July 10, 1956 |

OTHER REFERENCES

Stevenson: Ind. and Eng. Chem., vol. 40 (1948), pp. 1584–1589.

UNITED STATES PATENT OFFICE

CERTIFICATE OF CORRECTION

Patent No. 2,928,877                      March 15, 1960

Ernest Jaul et al.

It is hereby certified that error appears in the printed specification of the above numbered patent requiring correction and that the said Letters Patent should read as corrected below.

Column 3, line 44, for "procses" read -- process --; column 5, line 27, for "decanted" read -- decanter --; column 6, line 73, for "variable" read -- variables --; columns 7, and 8, Table V, fourth column thereof, under the heading "3", third line, for "0,6:5.3" read -- 0.6:5:3 --; column 8, lines 60 and 61, for "methoxyisopropxyisopropylamine" read -- methoxyisopropoxyisopropylamine --; line 74, for "methoxyisopropoxyisopropylamine" read -- methoxyisopropoxyisopropoxyisopropylamine --.

Signed and sealed this 30th day of August 1960.

(SEAL)
Attest:

ERNEST W. SWIDER
Attesting Officer

ROBERT C. WATSON
Commissioner of Patents